United States Patent [19]
Friend

[11] 3,869,804
[45] Mar. 11, 1975

[54] VEHICLE FRAME ALIGNMENT GAGE

[76] Inventor: George R. Friend, 2489 Foxdale Dr., San Jose, Calif. 95122

[22] Filed: June 4, 1973

[21] Appl. No.: 366,736

[52] U.S. Cl. .................................................. 33/288
[51] Int. Cl. ...................... G01c 15/12, G01b 11/26
[58] Field of Search ....... 33/288, 286, 228, 180 AT, 33/181 AT, 193

[56] References Cited
UNITED STATES PATENTS

| | | | |
|---|---|---|---|
| 2,000,866 | 5/1935 | Smith | 33/288 |
| 2,070,518 | 2/1937 | Smith | 33/193 |
| 3,611,575 | 10/1971 | Chartier | 33/288 |

Primary Examiner—Richard E. Aegerter
Assistant Examiner—Willis Little
Attorney, Agent, or Firm—John J. Leavitt

[57] ABSTRACT

Presented is a vehicle frame straightening gage for attachment to a bent or twisted vehicle frame prior to the straightening operation, which functions to indicate when the frame has been straightened to its original alignment. The gage itself does not impose stress on the bent or the twisted frame, this function being performed by related apparatus. The function of the gage is to indicate to the operator of such related apparatus when the frame has been returned to its original alignment.

12 Claims, 20 Drawing Figures

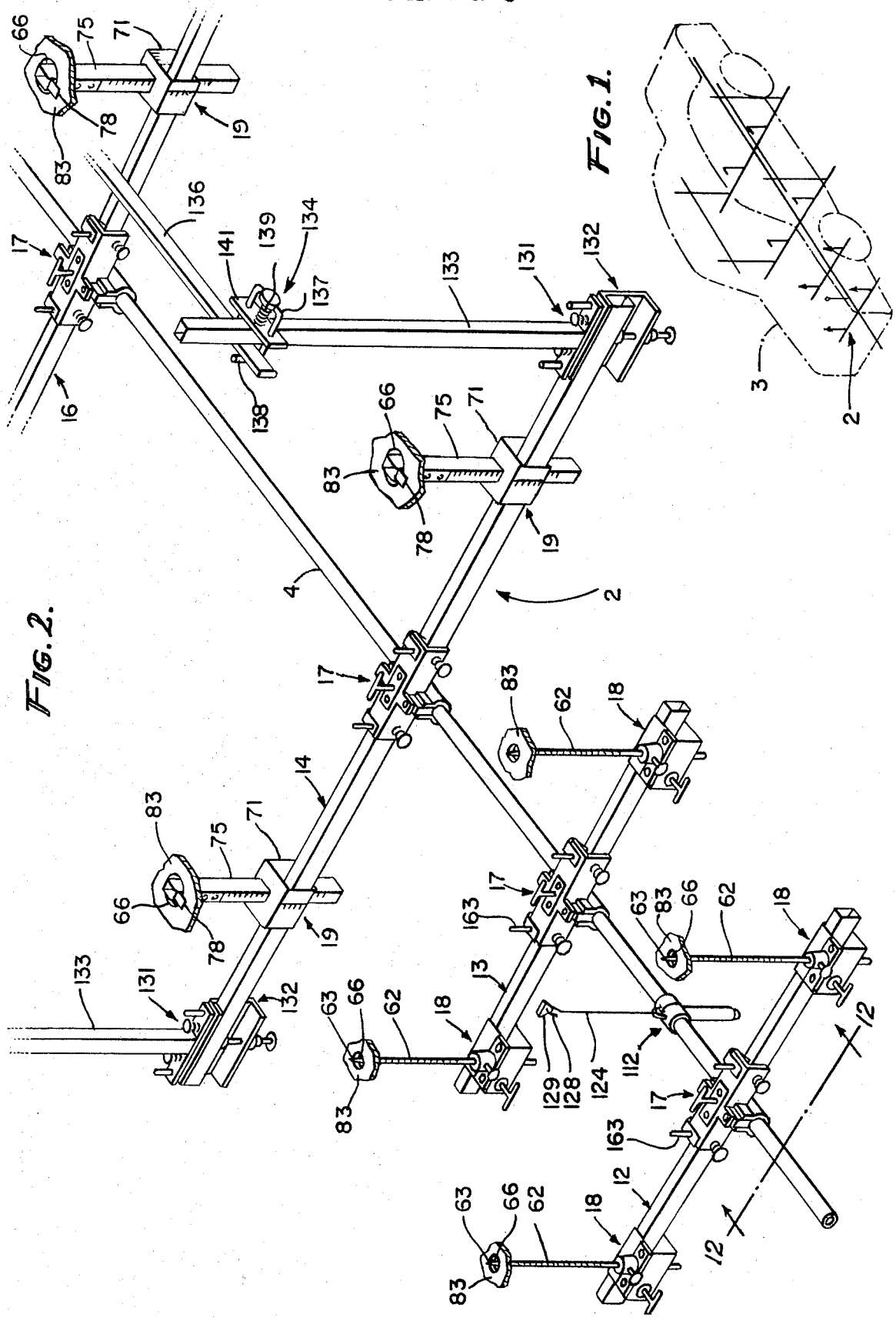

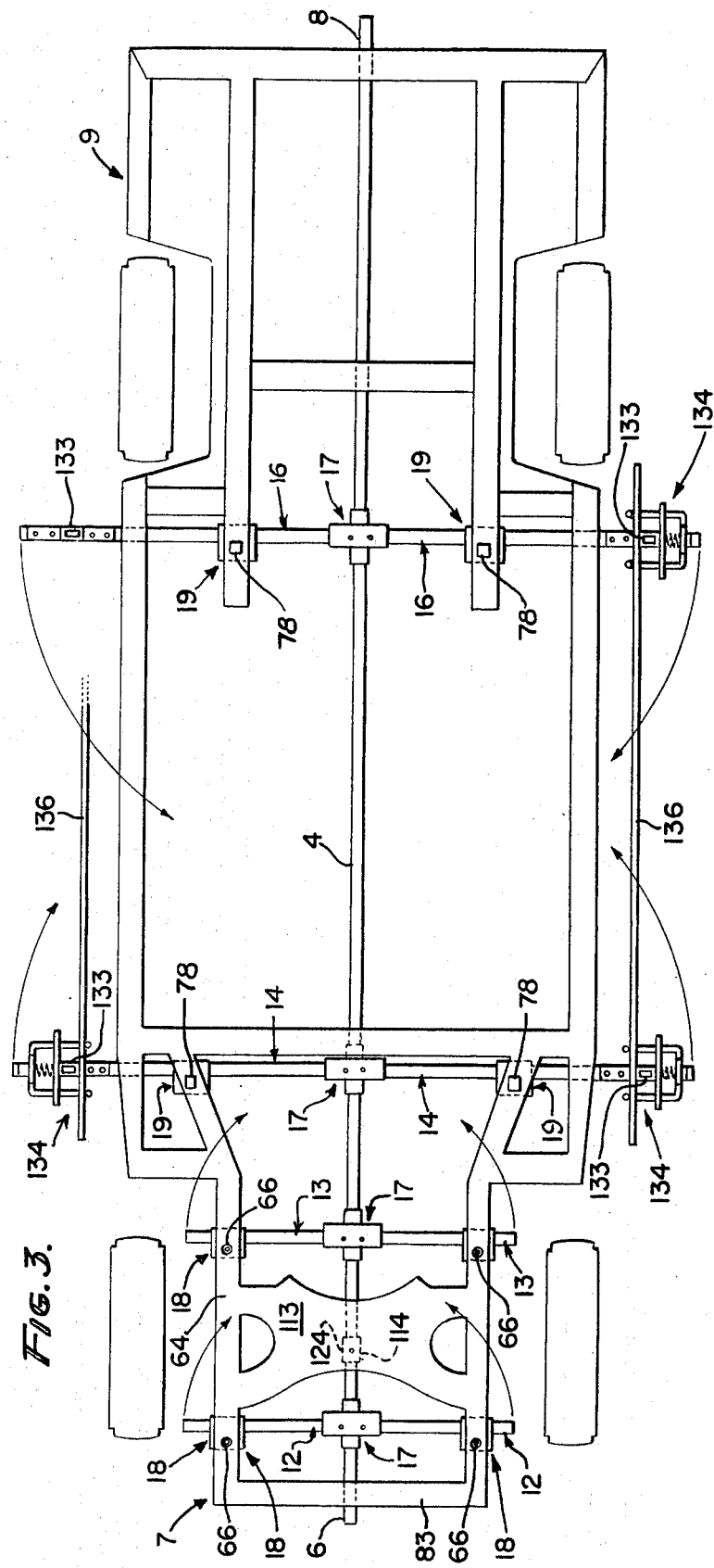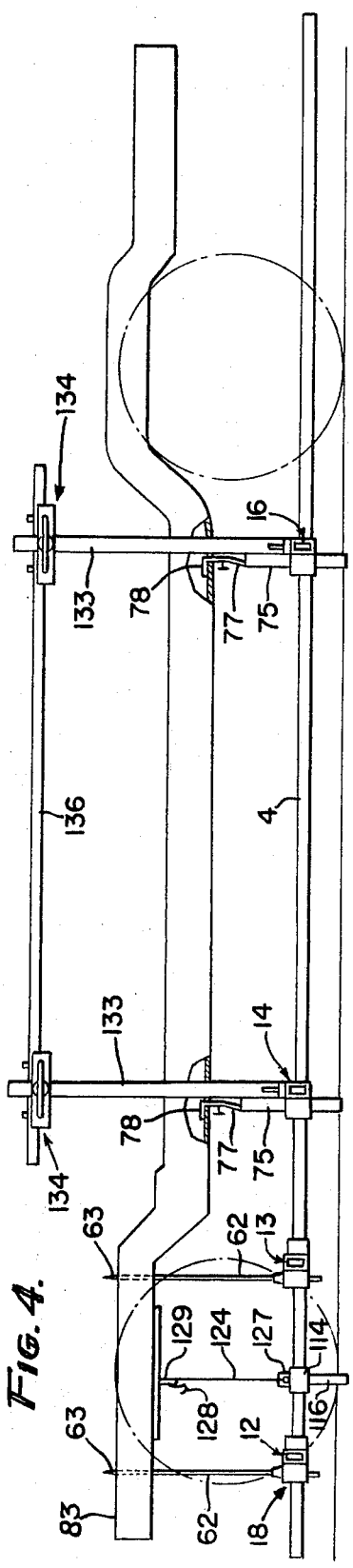

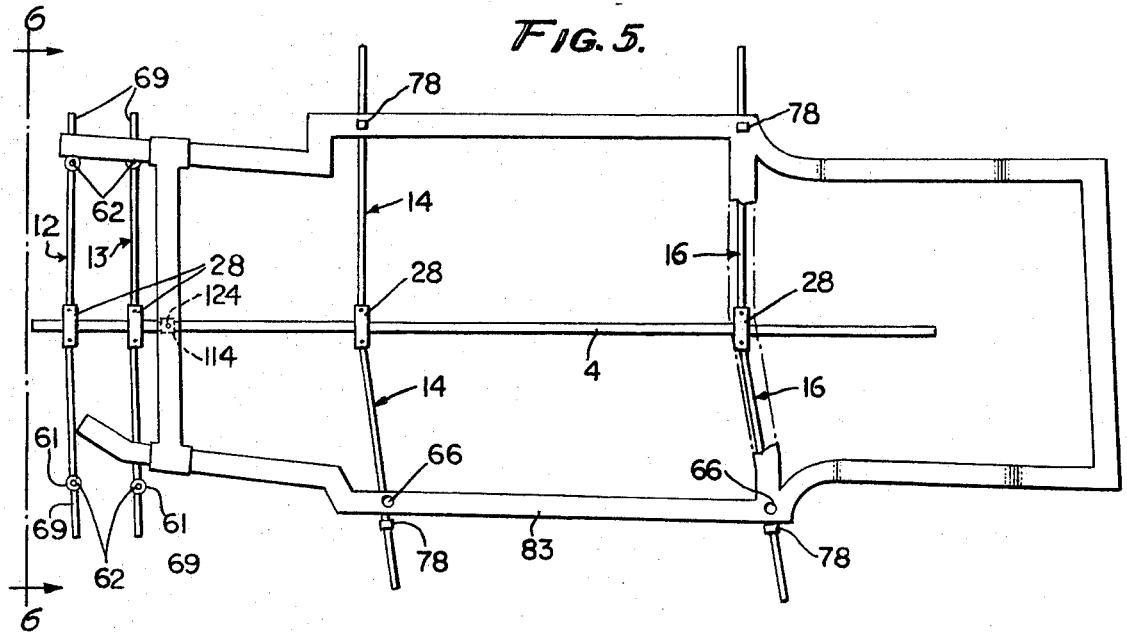
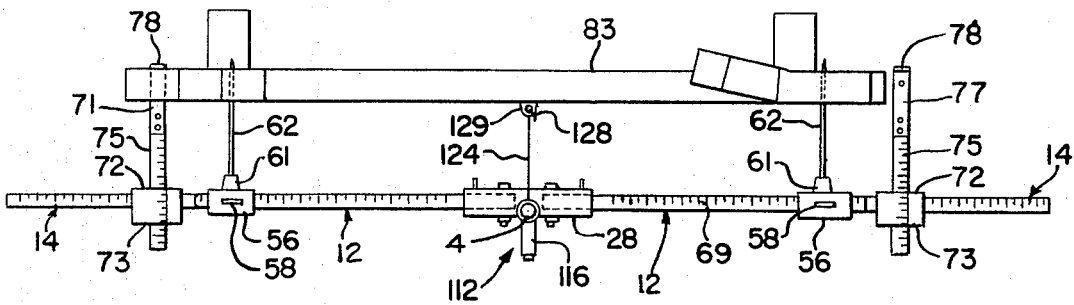
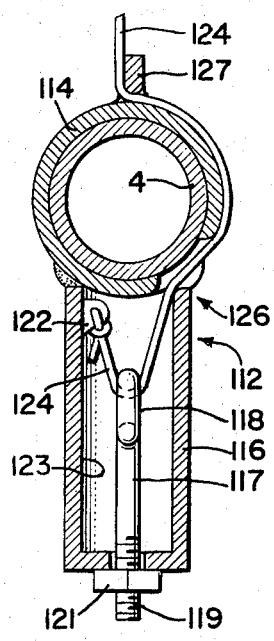
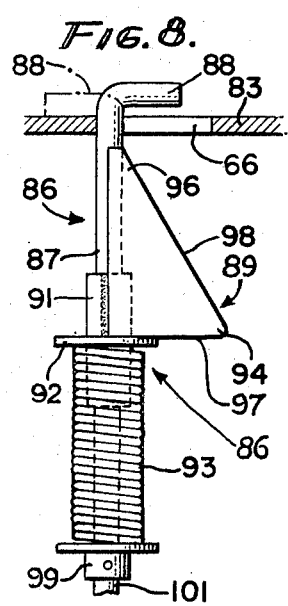
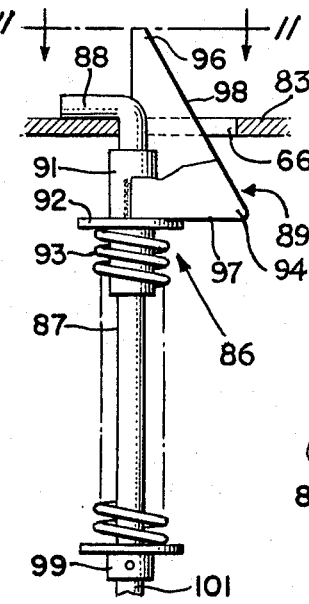
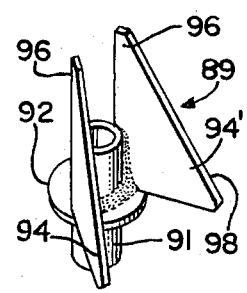
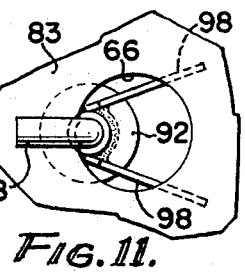

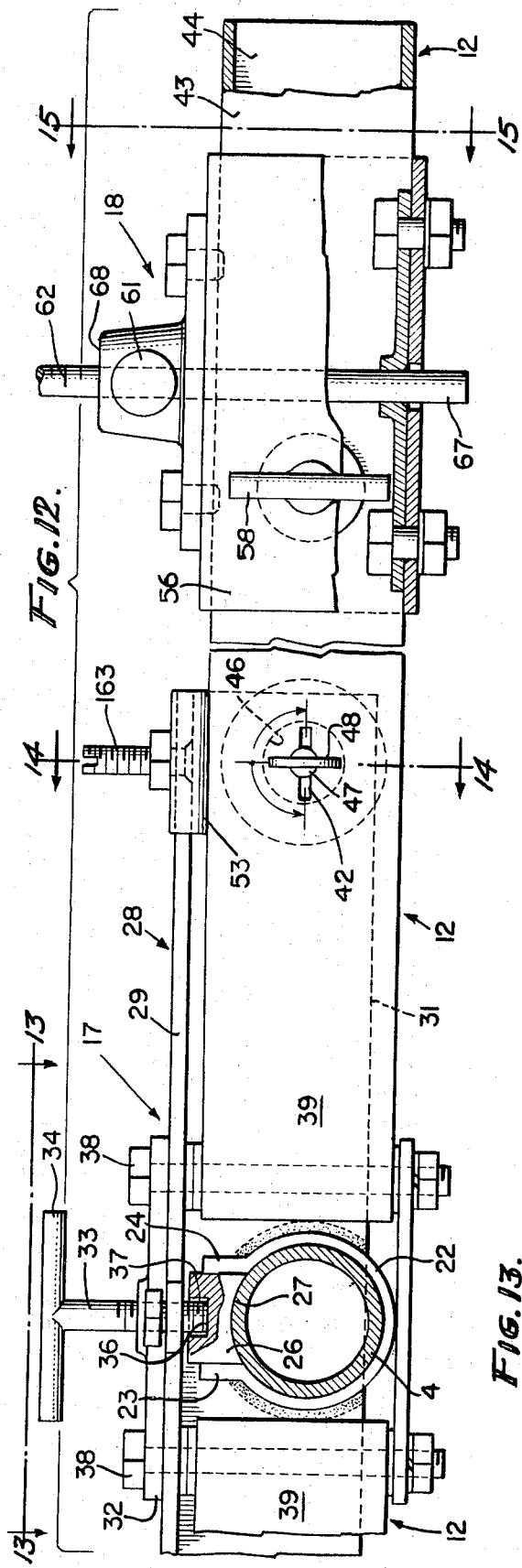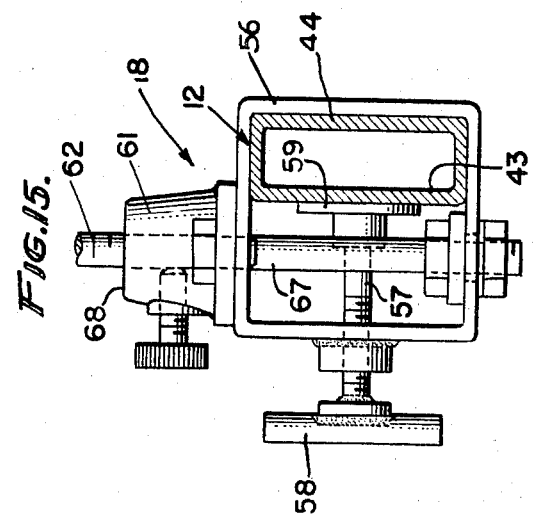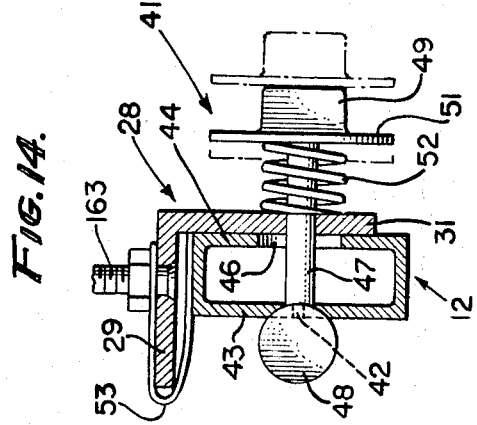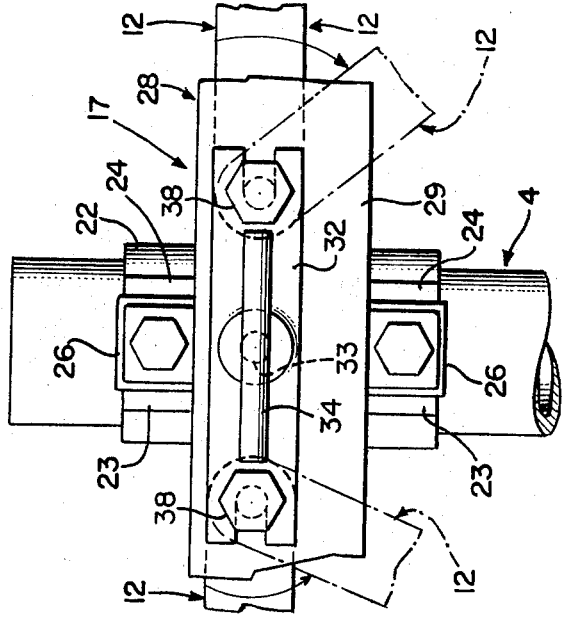

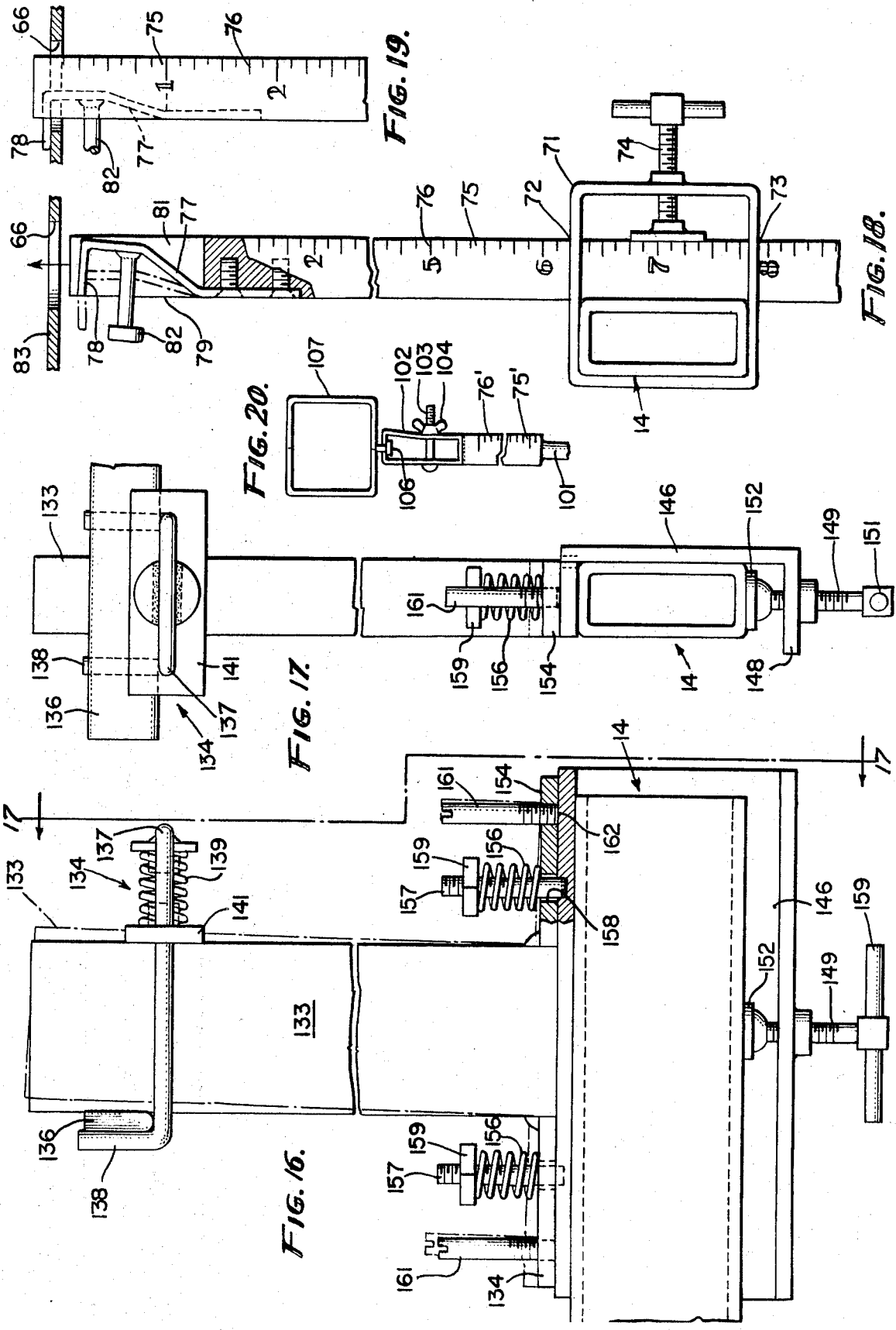

VEHICLE FRAME ALIGNMENT GAGE

BACKGROUND OF THE INVENTION

With more and more automobiles and other vehicular traffic using modern day high speed highways, the incidence of collisions between such automobiles and other vehicles has increased to the point where statisticians can almost predict the number of automobile accidents that will occur on a given day and predict the number of people that will be killed or seriously maimed in such collisions. What does not appear from the statistics is the fact that frequently in such collisions, it is not only the automobile body that is mangled and twisted, but the frame member or chassis on which the vehicle body is supported. Different type collisions will produce different types of damage to the chassis of an automobile.

For instance, a collision that results in one automobile being hit broadside by another will in most instances result in the mid-portion of the frame or chassis between front and rear wheels being pushed inwardly toward the opposite frame member. On the other hand, collisions in which the front or rear corners of the frame receives the impact of the collision will frequently result in the frame being wracked out of alignment so that the front and rear wheels do not track. Obviously, some collisions result in both types of damage to the chassis, the chassis being bent and twisted simultaneously.

Since most automobiles constitute a major investment for the automobile owner, and for an insurance company that is required to pay the damages, it frequently occurs that the automobile may be repaired more economically than it may be replaced. In those instances, the mangled remains of the automobile are towed to an automobile body shop or a frame straightening shop where the necessary frame straightening and body work will be done. Obviously, if the cost of repairing the damage is more than the car is worth, the car is usually junked and whatever may be salvaged is salvaged by a junk dealer.

In those instances in which the automobile can economically be repaired, before any body work is done on the automobile it is essential that the chassis be straightened so that it is returned to its original alignment. All frames are manufactured so as to have certain reference points which are related to each other dimensionally to determine when the frame is in proper alignment. In most instances, these reference points constitute special apertures formed in the frame at the time of manufacture, and are printed in book form as reference guides for the repair industry. Accordingly, it is one of the objects of the present invention to provide a vehicle frame straightening gage that may be attached to a twisted and bent vehicle frame prior to the straightening operation and which will indicate to the repair man when the reference points have reached their original position.

One of the disadvantages that has plagued repair men with conventional gages is the necessity to continually attach and detach the gage from the frame being straightened during the straightening operation to prevent it from being stressed or bent. Accordingly, another object of the present invention is the provision of a vehicle frame straighening gage that may be attached to the frame prior to commencement of the straightening operation and detached only after the frame has been completely straightened.

Other conventional frame straightening gages that may be left attached during the entire straightening operation have the disadvantage that the stresses imposed on the frame to effect re-positioning of its members will frequently be transmitted to the attached gage, stressing the gage beyond permissible limits and thus rendering the gage inaccurate for the purpose intended. Accordingly, a still further object of the present invention is to provide a vehicle frame straightening gage that may be left attached to the vehicular frame while it is being straightened and which is provided with means for accommodating any stresses that might be imposed upon it during the straightening operation.

Most conventional frame straightening gages are designed to provide a single reference point medianly positioned on the frame and from which lateral dimensions may be measured to the reference apertures provided in the frame members. These gages require, in general, the use of flexible tape measure and the continual use of the tape to make sure that the reference apertures in relation to the gage are in proper position. The need to make such repeated measurements is time consumming and tends to introduce error into the measurements, resulting in some instances in a misjudgment as to whether the frame is aligned or not. Accordingly, to obviate these difficulties, another object to the present invention is to provide a frame straightening gage that provides its own graduated members for determining the correctness of both vertical and horizontal measurements in relation to an elongated datum line provided by the gage.

The invention possesses other objects and features of advantage, some of which, with the foregoing, will be apparent from the following description and the drawings. It is to be understood however that the invention is not limited to the embodiment illustrated and described, as it may be embodied in various forms within the scope of the appended claims.

BRIEF SUMMARY OF THE INVENTION

In terms of broad inclusion, the vehicle frame straightening gage of the invention comprises an elongated datum member the axis of which is adapted to coincide with the intersection of vertical and horizontal reference planes positioned in a preselected relationship to the twisted and bent frame. Mounted on the datum member are a plurality of transversely extending datum bars, each being movable axially along the datum member to position each bar in relation to a selected set of reference apertures in the frame. Mounted on each transversely extending datum bar and extending vertically therefrom and movable transversely toward and away from the datum member, are vertical datum rods graduated to measure the height above the datum member at points laterally spaced therefrom so as to quickly and accurately pinpoint the proper position of a reference aperture in the associated frame during the straightening operation. Means are also provided on the datum member for setting its altitude in relation to the associated frame so that such datum member may be used as the reference line for all vertical and horizontal measurements on the frame. Means are also provided for use in conjunction with the gage for providing a reference plane to guide the straightening of the body in relation to the frame and in relation to a part of the body that has not been damaged, to thus enable repair of the automobile frame and body to esssentially its original alignment.

DESCRIPTION OF THE DRAWINGS

FIG. 1 is a perspective view illustrating schematically the application of the vehicle frame straightening gage to a vehicle shown in broken lines.

FIG. 2 is an enlarged perspective view illustrating the vehicle frame straightening gage. Portions of the structure are broken away to reduce its size.

FIG. 3 is a plan view illustrating the vehicle frame straightening gage applied to an automobile frame that is properly aligned.

FIG. 4 is a side elevational view of the vehicle frame straightening gage applied to an automobile frame that is in proper alignment.

FIG. 5 is a plan view of the vehicle frame straightening gage applied to a vehicle frame that is out of alignment by virtue of being bent and wracked.

FIG. 6 is a front-elevational view taken in the direction indicated by the arrows on the line 6—6 in FIG. 5 and illustrating the vehicle frame straightening gage applied to a bent and wracked vehicle frame.

FIG. 7 is a fragmentary vertical sectional view illustrating the means for suspending the datum member from the frame at a pre-determined elevation in respect thereto.

FIG. 8 is a fragmentary elevational view illustrating one of the suspensory means for suspending the gage from the frame in association with one of the reference apertures in the frame. The suspensory means is shown partially engaged.

FIG. 9 is a fragmentary elevational view similar to FIG. 8, and showing the suspensory means fully engaged in a reference aperture in the frame.

FIG. 10 is a perspective view of a portion of the centering device forming a part of the suspensory means of FIG. 9.

FIG. 11 is a fragmentary plan view illustrating the suspensory means from the direction indicated by the arrows on line 11—11 in FIG. 9.

FIG. 12 is a fragmentary vertical sectional view taken in the plane indicated by the line 12—12 in FIG. 2 and illustrating the method of mounting one of the transverse datum bars on the datum member and illustrating also the mounting of one of the vertical datum rods on the transverse datum bar.

FIG. 13 is a plan view taken in the direction of the arrows on line 13—13 in FIG. 12.

FIG. 14 is a vertical cross-sectional view taken in the plane indicated by the line 14—14 in FIG. 12.

FIG. 15 is a vertical cross-sectional view taken in the plane indicated by the line 15—15 in FIG. 12.

FIG. 16 is a fragmentary elevational view illustrating the guide means for providing a reference plane that may be used in straightening the body above the frame or chassis.

FIG. 17 is an end elevational view taken in the direction of the arrows on the line 17—17 in FIG. 16.

FIG. 18 is a suspensory device of a different design from that illustrated in FIG. 9. The suspensory device is illustrated in the position of its parts just prior to attachment to the reference aperture in an automobile frame.

FIG. 19 is a fragmentary elevational view of the suspensory device of FIG. 18 shown attached to the frame through the reference aperture therein.

FIG. 20 is still another suspensory device shown attached to the weld bead of a box-type frame member.

DESCRIPTION OF PREFERRED EMBODIMENT

In terms of greater detail, the vehicle frame straightening gage of the invention is adapted to be used in conjunction with a vehicle frame that has been bent, twisted or wracked, and functions to provide a reference or datum line to which vertical and horizontal measurements may be referred for the purpose of assuring that the frame or chassis being straightened is in proper alignment. Referring to FIG. 1, it is there seen that the vehicle frame straightening gage is illustrated in full lines and designated generally by the numeral 2, the gage being shown schematically and in relation with an automobile body illustrated in broken lines and designated by the numeral 3.

Referring to FIGS. 2, 3 and 4, as there shown, the frame straightening gage of the invention includes an elongated datum member 4 having a forward end 6 associated with the forward end of an automobile frame designated generally by the numeral 7. The opposite end 8 of the datum member is associated with the rear portion of the automobile frame designated generally by the numeral 9. Also forming part of the gage, are a plurality of transversely extending datum bars or beams 12, 13, 14 and 16. As illustrated in FIG. 3, each of the transversely extending datum beams 12, 13 and 14 are generally associated with the forward end portion 7 of the frame, while the datum beam 16 is associated with the rear portion 9 of the frame. Each of the datum beams is slidably mounted on the datum member 4 and may be locked in a selected position by a bearing member 17 which is identical for each of the datum beams and which, for purposes of brevity, will only be described once in connection with the detailed construction of the bearing member 17 illustrated in FIGS. 12 and 13.

To provide a vertical reference guide and measurement means, there is provided adjacent each opposite end of the transverse datum beams 12 and 13, vertical datum rod assemblies 18 which are slidably disposed on the associated transverse datum beam, and which may be clamped thereto at a pre-determined distance from the axis of the datum member 4. The detailed construction of this assembly is illustrated in FIGS. 2, 12 and 15.

To be effective, the vehicle frame straightening gage must be suspended from the vehicle frame with which it is associated. For this purpose, each of the transverse datum beams 14 and 16 is provided with pairs of suspensory assemblies designated generally by the numeral 19, each suspensory assembly being movable transversely along the beam so as to be located in association with one of the reference apertures provided in the frame. When properly located, each suspensory assembly may be locked to the supporting transverse datum beam or left free to slide thereon, depending upon the circumstances involved in the straightening operation. Suspensory devices are shown in greater detail in FIGS. 2, 8, 9, 18 and 19.

It frequently happens in a collision that one side of the automobile or the other will be damaged while the other side will not be damaged at all. In these circumstances, it is advantageous for the operator of the auto body shop to have a reference plane that he may refer to correlated to the undamaged side of the automobile body so that such dimensions and measurements that are made in relation to such reference plane may be transposed to the opposite or damaged side of the auto body. Accordingly, as illustrated in FIGS. 2, 3 and 4, there is mounted on the outboard end portion of each of the transverse datum beams 14 and 16, a body alignment assembly designated generally by the numeral 131. The body alignment assembly may also be selectively adjusted along the datum beam to place the reference assembly in the most advantageous position to constitute a reference plane. The detailed construction of the body alignment assembly is illustrated in FIGS. 16 and 17 and will be described in greater detail hereinafter.

From the foregoing it will be apparent that with the frame straightening gage properly positioned or suspended below a bent, twisted or wracked frame, all of the means are cooperatively associated in a single gage to provide the proper reference points for effecting fast and accurate straightening of the frame. With reference to the datum member 4, this member is preferably an elongated cylindrical tube, conveniently fabricated from high strength aluminum alloy and having a diameter of approximately 1 ½ inches and a length of approximately 20'. In FIG. 2, the datum member 4 is shown detached from an automobile, and is shown having mounted thereon the cross or datum beams 12-14 and 16. The bearing assembly 17 by which each of the cross beams 12-14 and 16 is mounted on the associated datum member 4 is illustrated in FIGS. 12 and 13 and each bearing assembly 17 includes a sleeve 22 wrapped partially around the cylindrical exterior periphery of the datum member 4 and having a pair of upstanding, spaced, parallel flange 23 and 24 which function to form a guideway for a metal shoe 26 disposed therebetween and having a lower surface 27 possessing a curvature corresponding to the outer periphery of the underlying datum member 4.

Extending transversely across the datum member and welded to the underlying sleeve 22 and upwardly extending flanges 23 and 24 thereof, is an angle member 28 (FIG. 14) having a horizontal flange member 29 and a vertically depending flange 31. It is the vertically depending flange 31 that is cut out to drop over the top of the sleeve 22 and which is welded thereto so that the top flange lies spaced closely above the top surface of the shoe 26. Bolted to the top surface of the flange 29 is a bearing plate 32 through which is threaded a spindle 33 having a handle 34 thereon, the lower end 36 of the spindle extending into an appropriate recess 37 spaced midway between the ends of the shoe. It will thus be seen that all that is required to clamp the bearing assembly 17 to the datum member 4 is to turn the handle and attached spindle 33 clockwise so as to cause the shoe 26 to impinge tightly against the associated surface of the underlying datum member. Conversely, to reposition the cross member, all that is required is to loosen the shoe by rotating the spindle 33 counterclockwise and then sliding the bearing assembly longitudinally along the datum member to whatever position is desired, and then re-clamping the assembly to the datum member. In the interest of brevity in this description and inasmuch as the bearing assemblies 17 are substantially identical, it is believed that the detailed explanation of the foregoing assembly will suffice since it applies to all of the bearing assemblies.

As illustrated in FIG. 12, the angle member 28 is bored vertically on opposite sides of the axis of the spindle 33 to receive elongated cap screws 38 which form pivots for the associated end 39 of each transversely extending datum beam 12, 13, 14 and 16, each beam being a two-part construction as shown, with each part extending in opposite directions from the datum member. To provide some measure of rigidity of mounting for each part of the cross-beam, it will be noted that the angle member 28 extends transversely for some distance on opposite sides of the datum member and overlaps the end of the associated cross-beam. Accordingly, the pivot point 38 is axially spaced from the associated end of the angle member 28.

Mounted adjacent the free end of the angle member 28, and adapted to cooperate with means formed in the cross-beam, is a lock device designated generally by the numeral 41 and illustrated in detail in FIG. 14. As there shown, the cross-member or beam with which it is associated, whether it be 12, 13, 14 or 16, is provided with a slot 42 in the wall 43 remote from the wall 44 lying next adjacent to the depending flange 31 of the angle member 28. The wall 44 on the other hand is provided with a circular aperture 46 positioned opposite the slot 42. Mounted on the depending flange 31 of angle member 28 is a lock comprising a stub shaft 47 having a flat wafer-like member 48 welded on its extreme end and having a diameter capable of passing through the slot 42. A head 49 is provided on the opposite end of the stub shaft 47, including a flange 51, a spring 52 being interposed between the flange 51 and the associated depending flange 31 of the angle member 28.

It will thus be seen that in the position of the parts illustrated in FIGS. 12 and 14, the cross-beam lies tightly locked against the depending flange 31 of the angle member 28, by virtue of the compressive force of the spring 52. Nevertheless, should an undue force be applied to the beam in opposition to the spring, it is apparent that the spring will flex to accommodate displacement of the beam by such stress, rather than strain the beam itself. Conversely, to unlock the beam so as to permit it to pivot freely into a position substantially parallel to the datum member 4, all that is required is that the shaft 47 be turned 90° so that the flat wafer-like member 48 is aligned with the slot 42, whereby the cross-beam may be pivoted away from the associated depending flange 31 of the angle member 28. This pivotal motion of each half of each cross-beam is illustrated by the arrows in FIG. 3. To insure that once in locked condition, the proper alignment of the cross-beam is maintained in relation to the supporting angle member 28, there is provided in association with each of the lock means 41 a resilient clip 53 secured to the top flange 29 of the angle member 28 and adapted to be resiliently displaced when the cross-beam is in locked position.

Referring to FIGS. 12 and 15, there is mounted on the outboard end of each half of the datum beams 12 and 13 a datum rod assembly 18 which includes a generally rectangular body member 56 adapted to encircle the associated cross-beam 12 (or 13, 14 or 16), the body 56 being provided wih an adjustable shaft 57 manipulable to clamp the body member to the cross-beam 12 as shown best in FIG. 15. The shaft 57 is preferably provided with a handle 58 that may be digitally manipulated so that the entire assembly may be adjusted in a one handed operation. Clamping is effected by a shoe 59 fitted to the free end of the shaft 57.

Also mounted on the body member 56 is a bearing pad 61 apertured as shown and secured to the upper side of the body 56 so that the aperture in the pad 61 is in vertical alignment with an aperture formed in the top wall of the body 56 and a corresponding aperture formed in the bottom wall of the body 56. The pad 61 and the apertures in the body 56 form slide bearings or journals for a vertically adjustable datum rod 62 vertically adjustable in the bearing pad 61 and the aforementioned apertures so as to bring the upper end 63 thereof (FIGS. 2 and 4) into a predetermined relationship with the frame 64 and reference apertures 66 formed therein.

As illustrated in FIGS. 12 and 15, the datum rod 62 is provided with graduations 67 which are gaged to have appropriate reference to the top surface 68 of the pad whereby to accurately locate the point 63 as to height in relation to the axis of the datum member 4. It will thus be seen that by properly adjusting the datum rod 62, the point 63 may be positioned at the appropriate height that is indicated for the reference aperture 66 of a given frame. In like manner, by adjusting the clamp means 57–59, the body 56 on which the datum rod is mounted may be moved axially with respect to the transversely extending datum beam so as to position the rod 62 at any given distance from the axis of the datum member 4. For this purpose, to facilitate a determination of the proper placement of the entire assembly 18, each of the datum beams 12, 13, 14 and 16 is provided with graduations 69 as illustrated in FIG. 6. The graduations are conveniently molded into the transversely extending datum beams, however, where it is desirable or necessary, a separate plate, appropriately graduated, may be secured to one face or the other of the datum beams.

As illustrated in FIG. 3, each of the points 63 of each datum rod 62 may be properly oriented in relation to to the reference apertures 66, the elevation of these apertures and their transverse distance in relation to the datum member 4 being information that is published and available from an appropriate manual. In this manner, before the straightening operation proceeds, it is possible for the operator to determine the amount by which the frame is out of alignment so as to aid him in determining how much pressure to apply to given portions of the frame to bring them back into alignment.

Apart from indicating position, it is clear that the datum member 4 and attendant cross beams must be supported or suspended from the frame in some convenient manner which will permit adjustment of the elevation of the datum member in relation to the frame to a predetermined position. To accomplish this feat, each of the datum beams 14 and 16 is provided on opposite sides of the datum member with a suspensory assembly 19 which is best illustrated in FIGS. 2, 8, 9, 18 and 19. The preferred suspensory device is illustrated in FIGS. 8 and 9, while a different embodiment is illustrated in FIGS. 18, 19 and 20. Referring to FIGS. 2, 18 and 19, it is there shown that each suspensory assembly includes a generally rectangular tubular body or shell 71 apertured top and bottom at 72 and 73 and provided with a clamp device 74 as shown.

Extending downwardly through the apertures 72 and 73 is the suspensory bar 75, provided with indicia 76 for determining the vertical extension of the suspensory bar 75 above a horizontal plane that includes the axis of the datum member 4. As shown, the graduated bar 75 may be positionally adjusted in relation to the box-like body member 71 by adjustment of the clamp means 74. The upper end of the suspensory device or bar 75 is provided with a resiliently depressable latch member 77 which may be depressed into the position illustrated in FIG. 18, in which the flange-end 78 of the latch lies within the confines of the edtes 79 and 81 of the bar when depressed in the position of the arrow 82. In this position of the resilient latch 77 it will be seen that the bar may be moved upwardly in the direction of the arrow through the reference aperture 66 formed in the frame member 83. FIG. 19 illustrates the position of the parts after the flange 78 has been engaged over the edge of the frame 83 surrounding the aperture 66.

In this position of the latch 77, it will be seen that by virtue of the bar 75 being clamped to the frame through the reference aperture 66 and being clamped to the transversely extending datum beam with which it is associated, the datum gage may be leveled or properly positioned so that all reference points for measuring vertical height in relation to the frame lie in a common horizontal plane, while all transverse dimensions may be measured in relation to a vertical plane that passes through the axis of the datum member 4.

A variation of the suspensory device illustrated in FIGS. 18 and 19 is illustrated in FIGS. 8, 9 and 20. Referring to FIGS. 8, 9, 10 and 11, it will there be seen that the suspensory device indicated generally by the numeral 86 includes a shaft portion 87 having a right angle hanger portion 88 at its upper end which is adapted to project through the aperture 66 in the frame member to place the right angle hanger member 88 above the apertured surface of the frame where it may be turned through 180° so that it rests on the frame at the edge of the reference aperture. Since measurements are generally referenced to one edge of the aperture, it is important that the suspensory device be suspended from the edge of the aperture from which measurements are to be made.

Accordingly, the shaft 88 is provided with a spring pressed adapter assembly designated generally by the numeral 89 and comprising a sleeve 91 slideably disposed on the shaft 87 and having a flange 92 welded thereon against which the spring 93 may impose resilient stress. Welded on the sleeve 91 are a pair of triangular plates 94 and 94' the apex ends 96 of which extend above the right angle hanger portion 88 of the shaft while the base ends 97 lie against the upper surface of the flange 92. The proportions of the triangular flanges is such that spring pressure exerted by the spring 93 causes the apex ends 96 to project upwardly through the reference aperture 66 to whatever distance is permitted by the inclined hypotenuse edge 98 which will be brought to bear against the inner periphery of the aperture 66. The purpose for the triangular configuration of the plates 94 is to permit the suspensory device to accommodate different size reference holes in the different type of frames that are manufactured. Thus, in one model automobile, the reference aperture may only be ½ inch in diameter, whereas in another frame, the reference aperture may be an inch in diameter. The structure disclosed in FIGS. 8, 9, 10 and 11 is universally applicable to all sizes of reference apertures formed in vehicle frames.

To provide a stop against which the spring 93 may act, the shaft 87 is provided with a collar 99 conveniently pinned to the shaft 87 at an appropriate position so that the spring 93 is always under a small amount of compression. Below the collar 99, the shaft 87 continues in an extension 101 which may terminate as shown in FIG. 20, attached to a clamp arm 102 digitally operated by a thumb screw 103 and a wing nut 104 to clamp the arm 102 on a flange 106 formed at the union of each half of a box section 107 forming the frame. In this embodiment it is noted that instead of a reference aperture 66 as provided in the frame member 83, the frame is provided with a centrally disposed flange 106 where the two channel-shaped frame members are welded together.

From the foregoing it will be seen that through proper positioning of the suspensory means illustrated in FIGS. 8 through 11, 18, 19 and 20, the vehicle straightening gage including the transversely extending beams disposed thereon may be set at whatever elevation is desirable or necessary depending upon the frame that is being straightened. It should also be apparent that in some instances it is undesirable that the suspensory assembly be clamped against transverse sliding movement on the supporting cross or datum beam with which it is associated. This condition may be brought about by the necessity of the suspensory assembly to readjust its position on the supporting beam by virtue of stress applied to it during the straightening operation. When this becomes necessary, all that is required with the instant structure is that the clamp means 74 illustrated in FIG. 18 be backed off so that the graduated rod 75 is no longer clamped against the datum beam. This will permit the box-like member 71 to slide freely along the cross beam in response to transverse stress applied to the graduated datum rod 75.

It should be obvious that the same condition may obtain in connection with the graduated vertical datum rod 62 associated with the forward end of the frame and terminating in a point 63 associated with selected reference apertures in the frame. As seen in FIG. 5, when the gage is applied to a bent and wracked frame, not all of the suspensory assemblies or datum rods 62 can be properly aligned with the appropriate reference points in the frame. Accordingly, in this instance, as seen in FIG. 5, the pointed and graduated datum rods 62 are positioned at their appropriate position assuming the frame were straight and the clamp means 57-59 illustrated in FIG. 15 is left in a relatively loose unclamped condition so that if any stress is applied to the vertically extending graduated datum rods by the straightening operation, damage will not occur to the graduated rods. Rather, such stress will occasion the shifting of the box-like member 56 laterally along the transversely extending beam on which it is supported.

In use for the purposes of straightening a frame that has been bent, twisted or wracked, such as the frame illustrated in FIG. 5 of the drawings, the frame straightening gage of the invention is disposed below the frame as illustrated in FIG. 5, and the suspensory assemblies 19 are attached to the frame through the appropriate reference apertures 66 or the bead 106 as illustrated in FIG. 20. After suspension of the gage, reference is made to published literature with respect to the appropriate dimensions for the frame in question, and the gage is adjusted so that its position provides a datum plane extending horizontally below the automobile frame to be straightened and coincident with the axis of the datum member 4. Additionally, the elevation of each of the suspensory assemblies 19 is adjusted to provide the appropriate elevation of that portion of the frame in relation to the horizontal datum plane so that as the straightening operation proceeds the operator will know when he has reached the optimum position for the frame.

In this regard, it is assumed that the operator will known at what points and in what directions to impose stress on the bent and wracked frame to return it to its original alignment. As the work progresses, the operator may from time-to-time have to move a frame member in such a manner that retention of one of the datum beams or vertically extending datum rods in its set position would constitute an obstruction or would severely damage the gage. In these instances, the latch mechanism illustrated in FIG. 14 may be easily and quickly unlatched and the obstructing datum beam swung out of position to permit shifting of the frame member in whatever manner is necessary. Upon completion of the movement of that frame member to its intended position, the datum beam may be swung back into its appropriate locking position to check the accuracy of the work that has been done. In this respect, it should be remembered that no other adjustment of the gage need be made.

When the gage is first installed under the frame to be straightened, it is helpful to be able to raise or lower the forward end of the datum member 4 by very fine increments. To effect such an adjustment, there is provided an adjustable suspension assembly designated generally by the numeral 112 which fits about the datum member 4 between the transversely extending datum beams 12 and 13 and which is adapted to hook onto the cross member 113 of the frame. The positioning of this assembly is illustrated in FIGS. 2, 3 and 4.

The suspension assembly 112 in greater detail includes a cylindrical sleeve 114 surrounding the cylindrical datum member 4 and having attached to its outer periphery a radially extending tube 116 within which is provided a shaft 117 which possesses an eye 118 at one end and which is threaded at its opposite end 119 to receive an adjustment nut 121. A lug 122 formed on the inside periphery 123 of the sleeve 116 provides an anchor point for a wire cable 124 which passes through the eye 118 and egresses from the tube 116 through an opening 126. The wire cable then passes around the outer periphery of the sleeve 114 and passes through an eye 127 to terminate at its upper end in a hook 128 appropriately anchored in an aperture 129 formed in the cross member 113 of the frame being straightened. It will thus be seen that by digital manipulation of the adjustment nut 121, the shaft 117 is caused to move axially within the enclosing tube 116, to lengthen or shorten the cable and thus alter the vertical position of the datum member 4. When the forward end of the datum member 4 has been adjusted to the optimum height in relation to the frame, the suspensory assemblies 19 are readjusted to the appropriate height in accordance with the published data on the particular frame being straightened.

As indicated above, the frame straightening gage of the invention may also be utilized to good advantage by auto body mechanics in straightening the automobile body that is attached to the form which has now been straightened. To straighten an automobile body that has been crushed and bent, it is necessary to establish a fixed reference point or line from which measurements may be taken so that both sides of the automobile may be duplicated during the straightening operation. Referring to FIGS. 2 through 4, 16 and 17, there is shown automobile body reference gages designated generally by the numeral 131, each body reference gage including a clamp assembly designated generally by the numeral 132 which attaches the body reference gage to the outer most end portions datum beams 14 and 16 as shown.

Mounted on each of the clamp assemblies 132 is a vertically extending post 133. Mounted on each post 133 and moveable therealong is an adjustable resiliently pressed clamp assembly 134 used in a manner which will hereinafter be explained in greater detail to retain a horizontally extending bar 136 that spans the space between the vertical posts 133 mounted on adjacent datum beams 14 and 16 as illustrated best in FIGS. 3 and 4. It will thus be seen that the horizontal bar 136 forms a reference line or plane that may be used as a basis for measurements between the reference bar or plane and the associated side of the automobile body. In this way, dimensions measured between the bar and the associated undamaged side of the automobile may be transferred to the opposite side and the bent and mangled metal of the damaged side may be pushed out to within very close limits of the same dimension of the undamaged side.

To retain the bar 136 adjustably spanning the space between the two vertical upright posts 133, the clamp assembly 133 includes a U-shaped member 137 having right-angle clamp portions 138 between which and the associated edge of the post 133 and the bar 136 is clamped by virtue of spring pressure imposed by the coil spring 139. Guide plate 141 disposed on the opposite side of the post from the bar 136 functions as a guide for movement of the U-shaped bracket, and impinges resiliently against the side of the post opposite the bar so that the frictional resistance between the plate 141 and the bar 136 is sufficient to retain the bar in whatever position is is set.

It sometimes happens that after the reference bar 136 has been set, and an operator is progressing to push out the metal of a damaged automobile body, a portion of the body being moved back into position will be over extended so that it impinges against the bar 136 or against the associated posts 133. To prevent damage to the bar or posts, and to otherwise provide an adjustment which will permit establishing the verticality or plumb of the posts 133, the clamp assembly 132 is best illustrated in FIGS. 16 and 17 and comprises a channel shaped member 146 having an upper web or flange 147 and a lower flange 148. When the clamp assembly is applied to the beam 14 or 16, a spindle 149 is tightened by means of handle 151 so that the shoe 152 impinges against the underside of the cross or datum beam as shown in the FIGS. 15 and 16.

The channel member 146 thus lies tightly clamped to the beam in whatever position it is placed. Superimposed over the top flange 147 of the channel member 146 is the vertically extending post 133, the lower end 153 thereof resting on the top surface of the top flange 147 as shown in FIG. 16. Welded to the lateral edges of the post 133 and extending generally parallel to and coincident with the top flange 147 are lug plates 154 which in general lie contiguous to the top surface of the associated top flange 147. To insure that these lug plates so lie, resilient pressure is imposed on each of the lug plates by a spring 156 impinging upon the top surface of each lug plate, and exerting an upwardly directed force on a stub shaft 157 the lower end of which is either welded or threaded to the top flange 147.

As shown, the stub shaft 157 at its lower end portion passes through an aperture 158 formed in each lug plate. The spring 156 is contained by a lock nut 159 threadably engaging the upper end of stub shaft 157. It will thus be seen that the post 133 with attached lug plates 154 is resiliently retained on the top surface of the flange 147 by the spring pressure imposed by the springs 156. It may be however that because of the manner in which the gage is adjusted or suspended on the frame, the post 133 will have to be adjusted toward or away from the automobile body being straightened. To permit such adjustment of the post 133, adjustment screws 161 are provided on the laterally extending lug plates 154, each of the adjustment screws 161 being threadedly engaged in the associated lug plate. Thus, as illustrated in FIG. 16, adjusting the left hand adjustment screw 161 so that its lower end 162 impinges against the upper surface of the underlying flange 147, causes the entire assembly to be tilted to the right as viewed in FIG. 16, as illustrated in broken lines.

Another advantage of the resilient mounting of the post 133 on the clamp assembly 132 is that if, during the straightening operation, the metal being moved by the operator moves beyond the limits intended and comes in contact with the post 133, the springs 156 will permit tilting of the post 133 with consequent compression of the springs, so that the strain is not transferred to the beam 14 on which the clamp assembly is mounted.

In aligning one structure with another, it is most helpful to have reference points that may be referred to, or which may be compared with other reference points to produce a given effect. Thus, in connection with the frame straightening gage of the invention, each of the bearing assemblies 17 is provided with a pair of upstanding pointers 163 as illustrated best in FIG. 2, the pointers being useful to provide sighting means in a fore and aft direction between the various cross or datum beams, to determine when one of them is out of alignment with the others. In the same manner, the pins 163 may be used to sight laterally along the transverse datum beams to check the alignment of the datum beams and the relative positions of one beam with respect to the others.

Having thus described the invention, what is claimed to be novel and sought to be protected by letters patent is as follows:

1. A vehicle frame alignment gage comprising:
   a. an elongated datum member adapted to be suspended below the frame to be aligned;
   b. a plurality of datum bars mounted on said datum member for selective adjustment therealong, said datum bars being pivotally mounted on said datum member so that said datum bars may be swung from a position generally parallel to said datum member to a position generally perpendicular thereto;
   c. datum rod assemblies mounted on the ends of said datum bars remote from said datum member and adjustable to control the height between said frame and said datum member; and d. means on the ends of selected ones of said datum bars remote from said datum member apart from said datum rod assemblies constituting a pointer assembly for visually designating the proper position of a point of reference on said frame without attachment to said frame and being selectively movable vertically and transversely in relation to said datum member and the datum bars on which said datum rod assemblies are mounted whereby during alignment of said frame said pointer assembly designates the proper position of said point of reference in relation to the datum member.

2. The combination according to claim 1, in which said datum rod assemblies are slidably mounted on said datum bars for selective adjustment toward and away from said datum member.

3. The combination according to claim 1, in which suspension means are slidably mounted on said datum member including a cable selectively attachable to said vehicle frame, said suspension means being adjustable to elevate or lower said datum member in relation to said frame.

4. The combination according to claim 1, in which said pointer assembly associated with selected ones of said datum bars includes a pointer rod provided with indicia means for determining the elevation of said pointer above said datum member.

5. The combination according to claim 1, in which each said datum rod assembly includes a bearing assembly slidably disposed on the associated datum bar for transverse adjustment thereon and selectively lockable thereto, and means for latching the upper end of each said datum rod assembly to an associated portion of the vehicle frame.

6. The combination according to claim 1, in which each said datum rod assembly comprises a suspension rod for suspending said datum member from the associated vehicle frame, each said suspension rod including clamp means for clamping the upper end of said suspension rod to the underside of said vehicle frame, said clamp means comprising a vertically extending resilient support member forming an extension of said suspension rod and a generally perpendicular clamp portion integral with said support portion and manipulable to extend through a reference aperture in said frame and engage the peripheral edge thereof whereby to detachably secure said suspension assembly to the underside of said vehicle frame.

7. A vehicle frame alignment gage comprising:
 a. an elongated datum member adapted to be suspended below the frame to be aligned;
 b. a plurality of datum bars mounted on said datum member for selective adjustment therealong;
 c. datum rod assemblies mounted on the ends of said datum bars remote from said datum member and adjustable to control the height between said frame and said datum member;
 d. means on the ends of selected ones of said datum bars remote from said datum member constituting a pointer assembly for designating the proper position of a point of reference on said frame whereby during alignment of said frame said pointer assembly designates the proper position of said point of reference in relation to the datum member; and
 e. vehicle body alignment means mounted on the end portions of said datum bars remote from said datum member, said vehicle body alignment means including a post adjustably associated with each end of each datum bar, and a bar adjustably mounted on adjacent posts and movable in relation to said vehicle body to form a plane of reference to which measurements may be related.

8. The combination according to claim 7, in which means are provided mounting said post resiliently on the associated end of said datum bar, said resilient mounting means including a channel clamp mounted on said datum bar and a spring assembly interposed between said post and said channel clamp to resiliently retain the post on said channel clamp.

9. The combination according to claim 7, in which clamp means are provided on each said post for clamping said reference bar thereto, each said clamp means comprising a U-shaped bracket straddling said post and including right angle clamp portions adapted to clamp said reference bar between said right angle portions and the associated edge of said post, and spring means interposed between said U-shaped bracket and said post to impose a resilient bias on said clamp means to resiliently clamp the reference bar to the associated post.

10. A vehicle frame alignment gage comprising:
 a. an elongated datum member adapted to be suspended below the frame to be aligned;
 b. a plurality of datum bars mounted on said datum member for selective adjustment therealong, each said datum bar comprising a bearing assembly slidably journaled on said datum member and including means for selectively locking said bearing assembly to said datum member against slidability, said datum bar including a pair of datum beams each pivotally mounted by one end on said bearing assembly and independently pivotal from a position parallel to said datum member to a position substantially perpendicular thereto.
 c. datum rod assemblies mounted on the ends of said datum bars remote from said datum member and adjustable to control the height between said frame and said datum member; and
 d. means on the ends of selected ones of said datum bars remote from said datum member constituting a pointer assembly for designating the proper position of a point of reference on said frame whereby during alignment of said frame said pointer assembly designates the proper position of said point of reference in relation to the datum member.

11. The combination according to claim 10, in which lock means are provided for selectively locking each said datum beam to the associated bearing assembly in said perpendicular position.

12. A vehicle frame alignment gage comprising:
 a. an elongated datum member adapted to be suspended below the frame to be aligned;
 b. a plurality of datum bars mounted on said datum member for selective adjustment therealong;
 c. datum rod assemblies mounted on the ends of said datum bars remote from said datum member and adjustable to control the height between said frame and said datum member, each said datum rod assembly comprising a suspension rod for suspending said datum member from the associated vehicle frame, each said suspension rod including clamp means for clamping the upper end of said suspension rod to the underside of said vehicle frame, said clamp means comprising a vertically extending support member forming an extension of said suspension rod and a generally perpendicular clamp portion integral with said support portion and manipulable to extend through a reference aperture in said frame and engage the peripheral edge thereof whereby to detachably secure said suspension assembly to the underside of said vehicle frame, said vertical support portion constituting a cylindrical rod, a sleeve journaled on said rod, generally triangular plate means mounted on said sleeve and oriented so that the hypotenuse edges thereof lie spaced apart and angularly disposed to the axis of said rod, and spring means mounted on said rod below said sleeve to resiliently bias said triangular plate means into engagement with the associated reference aperture in said frame; and d. means on the ends of selected ones of said datum bars remote from said datum member constituting a pointer assembly for designating the proper position of a point of reference on said frame whereby during alignment of said frame said pointer assembly designates the proper position of said point of reference in relation to the datum member.

* * * * *